United States Patent [19]
Brownyer

[11] 3,892,297
[45] July 1, 1975

[54] BRAKE DISC COVERING STRUCTURE

[76] Inventor: Nelson R. Brownyer, 3731 Peabody Dr., Birmingham, Mich. 48010

[22] Filed: Feb. 12, 1974

[21] Appl. No.: 441,796

Related U.S. Application Data

[63] Continuation of Ser. No. 320,712, Jan. 3, 1973, abandoned.

[52] U.S. Cl....... 188/218 XL; 188/71.6; 188/251 M; 188/264 AA; 192/107 R; 192/113 A
[51] Int. Cl....................... F16d 65/12; F16d 65/84
[58] Field of Search.......... 188/71.6, 73.2, 218 XL, 188/251 M, 264 A, 264 AA; 192/107 R, 113 A, 70.12

[56] References Cited
UNITED STATES PATENTS

| | | | |
|---|---|---|---|
| 1,717,522 | 6/1929 | Rosenberg | 188/264 A |
| 3,478,849 | 11/1969 | Halm | 188/251 M X |
| 3,667,581 | 6/1972 | Hanks | 192/113 A |

FOREIGN PATENTS OR APPLICATIONS

| | | | |
|---|---|---|---|
| 1,478,386 | 3/1967 | France | 188/218 XL |
| 1,283,611 | 11/1968 | Germany | 188/218 XL |

*Primary Examiner*—George E. A. Halvosa
*Attorney, Agent, or Firm*—Strauch, Nolan, Neale, Nies & Kurz

[57] ABSTRACT

A disc brake assembly including a rotor of one or two piece construction and having heat sinks backing the oppositely facing radial braking surfaces of the rotor, with the heat sinks having different thermal capacities.

5 Claims, 6 Drawing Figures

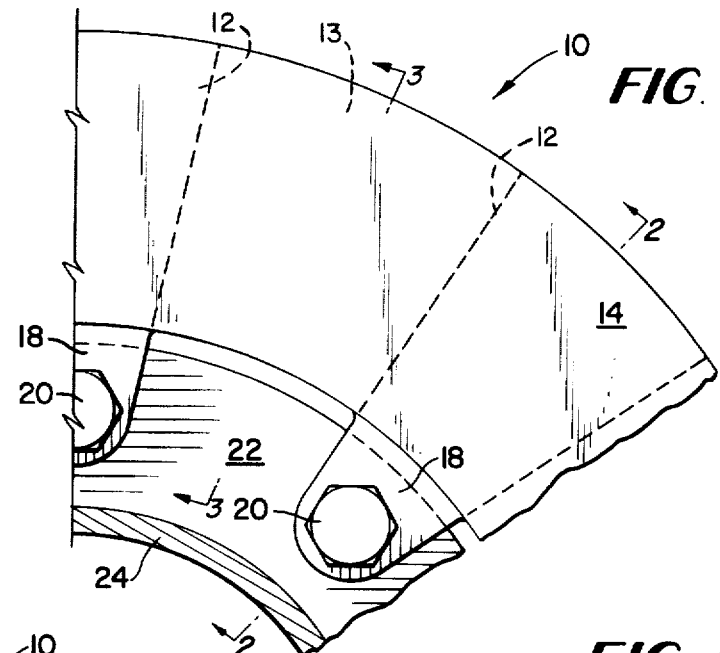
FIG. 1
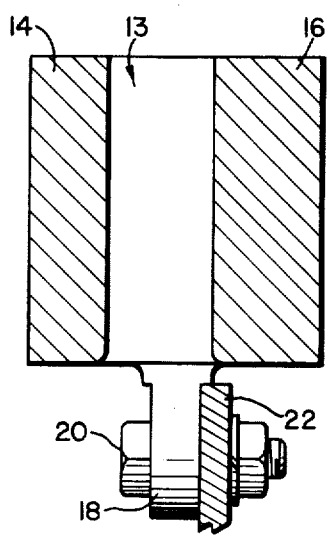
FIG. 3
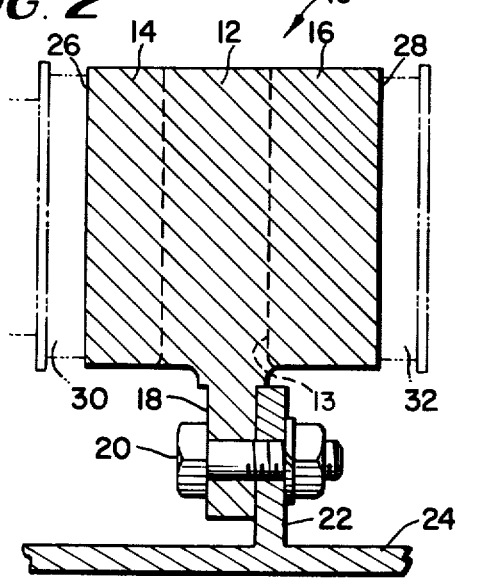
FIG. 2
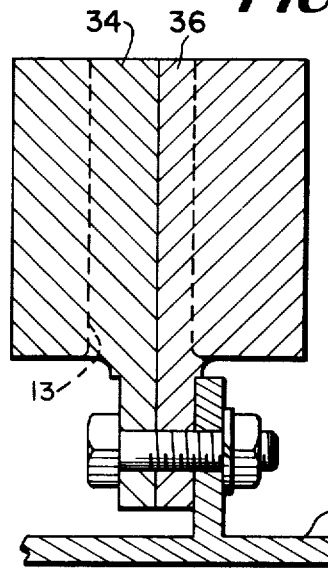
FIG. 4
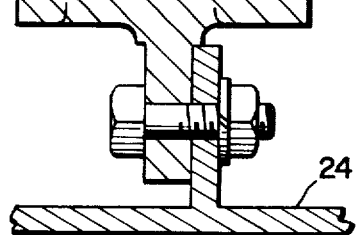
FIG. 5
FIG. 6

BRAKE DISC COVERING STRUCTURE

This is a continuation of application Ser. No. 320,712, filed Jan. 3, 1973, now abandoned.

BACKGROUND OF THE INVENTION

This invention relates generally to disc brakes and more particularly to a disc brake rotor of novel construction.

In disc brake assemblies, the primary cause of wear of the usual asbestos type brake pads is heat which is concentrated at the contact faces between the pads and the rotor. Thus, to prolong the life of the pads as well as to maintain consistent performance, it is essential that the heat be dissipated as rapidly as possible to avoid such a harmful concentration or build up of heat at the contact faces.

In attempting to use disc brakes on trucks, particularly those employing dual wheels, the environmental conditions in which the brake is to operate underlined the need for a rotor having unique heat sink characteristics suitable for various individual installations. It was realized that in some installations the environmental and/or operating conditions at opposite sides of the rotor adjacent the oppositely facing braking surfaces may differ and may thus require different heat sinks backing the braking surfaces.

SUMMARY OF THE INVENTION

Accordingly, a primary object of this invention resides in the provision of a disc brake assembly having a rotor of novel construction.

Another object of this invention resides in the provision of a novel rotor for a disc brake assembly, the rotor having heat sinks of different thermal capacities backing the oppositely facing radial braking surfaces of the rotor.

Still another object of this invention resides in the provision of a novel rotor having a heat sink of varying radial thickness backing a braking surface of the rotor, the thickness of the heat sink being greatest in areas of maximum potential temperature rise due to a difference of work done or a difference in rate of cooling.

Still other objects and advantages will become apparent from reading the following description of the invention wherein reference is made to the accompanying drawings in which like numerals indicate like elements.

BRIEF DESCRIPTION OF THE DRAWINGS

FIG. 1 is a fragmentary end view of a disc brake rotor constructed according to the invention;

FIG. 2 is a fragmentary sectional view taken generally along line 2—2 of FIG. 1 and illustrating one form of the rotor formed as one-piece;

FIG. 3 is a view taken along line 3—3 of FIG. 1, illustrating the ventilating slots between the heat sinks;

FIG. 4 is a view similar to FIG. 2 but illustrating a rotor formed in two pieces;

FIG. 5 is a fragmentary sectional view of another form of a one-piece rotor wherein each of the heat sinks has varying thicknesses along the radial direction; and FIG. 6 is a view similar to FIG. 5, but with the rotor formed in two pieces.

DETAILED DESCRIPTION OF THE INVENTION

Referring now to FIGS. 1-3 of the drawings, the rotor 10 of a disc brake assembly constructed according to the invention may be formed in one-piece as by casting to include annular metal ring members 14 and 16 which act as heat sinks. Members 14 and 16 are integrally joined together by a plurality of intermediate, circumferentially spaced ribs 12 which cooperate to define a plurality of circumferentially spaced air ventilating slots 13 between members 14 and 16. A plurality of lugs 18 extend radially inwardly from ribs 12 and are connected via bolts 20 to a flange 22 formed on a hub 24 so that rotor 10 rotates with hub 24. This manner of rotating the rotor is for illustration only and in actual practice the rotor may be supported and driven in any suitable manner from its inner or outer periphery.

The outer radial faces 26 and 28 of heat sink members 14 and 16 constitute oppositely facing annular braking surfaces adapted to be frictionally engaged by non-heat conducting type brake pads 30 and 32 of a conventional caliper assembly actuated in a conventional manner.

During application of the brake pads against braking faces 26 and 28, it is important that the heat developed at faces 26 and 28 be dissipated as rapidly as possible. Experience has shown that the two most important factors in effectively dissipating the heat are the provision of adequate heat sink backing faces 26 and 28 and maximum exposure of faces 26 and 28 to their environment. The latter of course results from minimizing the number of braking pads in the assembly and the effective contact area of each pad, and also maximizing the air flow past the rotor braking faces as the rotor rotates.

In some applications, e.g. when disc brakes are installed on heavy duty trucks, environmental conditions may be such that there is a tendency to develop and concentrate more heat at one braking face 26 and 28 than at the other, and it may be more difficult to dissipate the heat from one of the faces than the other. For example, a particular wheel design may produce more effective air circulation over one braking face than over the other. This problem could be alleviated by making one of the heat sink members 14 and 16 of thicker construction. The thickness of each of the members could be varied by adding or removing metal from its inside wall defining one side of slots 13. Thus, changing the thickness of heat sinks 14 and 16 will alter the axial width of slots 13. However, the overall axial width of the rotor is maintained constant even though the effective thickness of the heat sinks may be varied. Thus rotors having different, heat dissipating characteristics may be interchangeable.

As shown in FIGS. 2 and 3, when face 28 tends to become hotter than face 26, heat sink 16 is made thicker than heat sink 14 and consequently will have a greater heat capacity. By selecting the proper thickness for the heat sinks, the heat dissipating characteristics of the heat sinks backing braking faces 26 and 28 may be selected as desired, and the additional metal in a thicker heat sink need only be applied where necessary to dissipate heat more rapidly away from the rotor braking face.

The rotor illustrated in FIG. 4 is the same as that shown in FIG. 2, except that it is formed by two separate cast or forged metal pieces 34 and 36 which preferably are brazed together although they may be merely retained in place by bolt assemblies 20.

The abutting faces of pieces 34 and 36 will be provided with recesses which define ventilating slots such as slots 13 and the heat sink thicknesses may be varied in the same manner as in FIG. 2. In addition, constructing pieces 34 and 36 of different metals also enables the heat dissipating characteristics of the rotor to be varied.

In some circumstances, e.g. when the rotor is very large in diameter, the thermal conditions on each rotor braking face may vary to such a degree so as to necessitate more heat sink backing at specific radial portions of the faces. For example, because the radial velocity of the rotor is greatest at the outermost peripheral portions of the rotor, a greater amount of heat is produced in those portions. The rotor 40 shown in FIG. 5 is particularly suited for such installations and includes annular metal heat sink members 44 and 46 having braking faces 48 and 50. Not only are the heat sinks 44 and 46 of different thickness (as in FIG. 2), but their inside walls defining slot 13 taper so that each of the heat sinks tapers from greater thickness at their outer peripheral edge to a smaller thickness at their inner edge to provide more heat sink backing for those portions of faces 48 and 50 having the greater radial velocities.

The rotor shown in FIG. 6 is the same as that illustrated in FIG. 5, except that it is formed in two pieces 52 and 54 and may be constructed of different metals to enable additional variation of the heat dissipating characteristics of the rotor. As in the rotor of FIG. 4, the two pieces 52 and 54 may be cast or forged and then brazed or otherwise secured together.

From the description hereinabove, it is apparent that a disc brake rotor may be constructed according to the invention to provide various heat absorbing and dissipating characteristics to satisfy the conditions of a particular installation. This is conveniently done without wasting metal and unnecessarily increasing the weight of the rotor, since the additional thickened heat sink sections are selectively provided only behind those portions of the rotor braking faces from which heat must be pulled away more rapidly.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A disc brake assembly having a metal rotor selected from a series of metal rotors of the same construction and the same overall axial thickness, each one of said series of metal rotors having a pair of oppositely facing radial metal braking surfaces directly engageable by brake pads and separate heat sink means for absorbing and dissipating heat integral with the respective braking surfaces and backing each of said braking surfaces, said heat sink means being of different mass predetermined solely by desired heat sink characteristics for each of said heat sink means and both said heat sink means being of predetermined thickness increasing radially outwardly of the rotor center, the heat absorbing and dissipating characteristics of the two heat sink means differing to a predetermined degree and the heat absorbing and dissipating characteristics of the heat sink means of each metal rotor in said series differing from one another, whereby a metal rotor having the desired heat sink characteristics may be selected from said series and incorporated into a disc brake assembly to suit operational requirements.

2. The rotor described in claim 1, wherein one of said heat sink means is thicker than the other.

3. The rotor described in claim 1, wherein said rotor is formed by a pair of annular pieces secured together with their inner surfaces in contact, and means providing recesses at said inner surfaces defining ventilating slots between said heat sink means.

4. The rotor described in claim 3, wherein said annular pieces are of different metals having different heat dissipating characteristics.

5. The rotor described in claim 3, wherein one of said annular pieces is thicker than the other.

* * * * *